Patented Sept. 17, 1935

2,014,889

UNITED STATES PATENT OFFICE 2,014,889

METHOD OF PRODUCING CONDENSATION PRODUCTS OF FORMALDEHYDE AND UREA WITH THE CONJOINT USE OF THE CONDENSATION PRODUCTS DERIVED FROM GLYCERINE AND PHTHALIC ANHYDRIDE

Stefan Goldschmidt, Karlsruhe, and Rudolf Mayrhofer, Leverkusen, Germany

No Drawing. Application July 19, 1929, Serial No. 379,574. In Germany July 23, 1928

11 Claims. (Cl. 260—3)

This invention relates to a method of producing condensation products of formaldehyde and urea with the conjoint use of the condensation products derived from glycerine and phthalic anhydride.

It is known that the properties of the condensation products derived from formaldehyde and urea may be very considerably influenced by the addition of other substances. Polyvalent alcohols, and furthermore phthalic anhydride have proved to be particularly suitable in this connection. At the same time, however, it has been shown that it is preferable to at first subject the polyvalent alcohols, for example glycerine with phthalic anhydride, to a condensation process alone at increased temperature, and to add the product of condensation to the mixture of urea and formaldehyde prior, or even better during or also after condensation of the latter, employing at the same time an acid or alkaline condensation agent. In this connection it is immaterial whether the condensation of the formaldehyde and the urea occurs in an acid or alkaline solution or in stages in alkaline and acid solution. The amount of alcohol employed for condensation with phthalic anhydride may be so chosen that the products of condensation after their formation still contain excess glycerine.

It is possible in this manner to obtain products which may be hardened at a substantially higher temperature than products which are derived in the usual manner. A cracking of the condensation products occurring during the hardening process in a large number of methods may also be completely avoided in the present method.

*Example 1.*—220 parts by weight of glycerine are heated with 90 parts by weight of phthalic anhydride until the whole has become dissolved, at the same time stirring being performed as required, the mixture then being allowed to boil for approximately between 5 and 7 hours, whereupon 30 grams of the product thus obtained are added while still hot to a condensation product of formaldehyde and urea, which has been produced as follows: 80 grams of trioxymethylene, 59 grams of urea, 45 grams of glycerine and 30 grams of water are mixed together, and after the addition of a few drops of a saturated solution of sodium carbonate are heated for a long time up to boiling. Now the mixture is again allowed to boil for a short time, finally such amount of sulphuric acid being added that a weak acid reaction just takes place. Boiling is then again effected for a short time, and the clear, thin condensation product poured into moulds. After the mouldings have set the same are hardened at increased temperature.

*Example 2.*—The condensation product of glycerine and phthalic anhydride is produced in the manner described in conjunction with Example 1. 80 grams of trioxymethylene, 90 grams of urea, 80 grams of water and 3 ccm. of a 2-n-sodium bicarbonate solution are condensed by heating as described above. To this mixture are then added 160 grams of the condensation product obtained from the glycerine and phthalic anhydride. The process is finally completed, as above, after the addition of 5 ccm. of 2-n sulphuric acid.

*Example 3.*—285 grams of trioxymethylene, 315 grams urea and 335 grams of 40% formaldehyde solution are mixed, and after the addition of 1.5 grams of sodium carbonate or a corresponding amount of barium hydroxide heated for a relatively long time up to boiling. After a short space of time are then added 100 grams of the condensation product described in conjunction with Example 1, derived from 100 parts by weight of glycerine and 100 parts by weight of phthalic anhydride. Boiling is then performed for a period of about 20 minutes, and the product poured into moulds.

*Example 4.*—400 grams of trioxymethylene, 400 grams of urea, 100 grams of water and 100 grams of glycerine are mixed, and after the addition of 10 ccm. 4-n sulphuric acid or hydrochloric acid heated for a relatively long time up to boiling. To this are then added 150 grams of the condensation product derived from 220 grams of glycerine and 225 grams of phthalic anhydride, boiling then being effected for a short time and the product poured into moulds.

*Example 5.*—335 grams of trioxymethylene, 165 grams of 40% formaldehyde solution and 300 grams of urea are mixed together, and after the addition of 20 ccm. 2-n sodium carbonate solution or a corresponding amount of sodium hydroxide heated for a relatively long time up to boiling. 450 grams of the product of condensation derived from 440 grams of glycol and 180 grams of phthalic anhydride are then added.

After boiling for approximately half an hour 20 ccm. of 2-n sulphuric acid or hydrochloric acid are added, boiling then being again performed for a short time and the product poured into moulds.

It will be perfectly obvious that no limitation is made to the proportions set forth in the above examples, and that various modifications are quite possible within the meaning of the above and the annexed claims without departing from the spirit of the invention.

What we claim as new and desire to secure by Letters Patent is:

1. The processs of producing urea-aldehyde resins which comprises causing urea and an aldehyde to react progressively to the production of a resin, a phthalic anhydride-polyvalent alcohol condensation product being present in the reaction mixture during at least the latter portion of the progressive reaction.

2. In a process of producing condensation products of urea and formaldehyde the steps which consist in mixing 220 parts by weight of glycerine with 90 parts by weight of phthalic anhydride, boiling the mixture for 5–7 hours, adding the resulting product while still hot to the extent of 30 grams to the condensation product derived from 80 grams of trioxymethylene, 59 grams of urea, 45 grams of glycerine, 30 grams of water and a few drops of a saturated solution of sodium carbonate, boiling the resulting mixture, adding an amount of sulphuric acid until a weak acid reaction occurs, again effecting boiling, pouring the resulting product into moulds, and after the product has set hardening the same at increased temperature.

3. In a process of producing condensation products of urea and formaldehyde the steps which consist in mixing together 80 grams of trioxymethylene, 90 grams of urea, 80 grams of water, and 3 ccm. of 2-n sodium carbonate solution and condensing the same by heating, adding to the resulting product 160 grams of a condensation product derived from 220 parts by weight of glycerine and 90 parts by weight of phthalic anhydride, boiling the resulting mixture, adding 5 ccm. of 2-n sulphuric acid, again boiling, pouring the resulting product into moulds, and after the same has set hardening at increased temperature.

4. In a process of producing condensation products of urea and formaldehyde the steps which consist in mixing together 285 grams of trioxymethylene, 315 grams of urea, and 335 grams of a 40% solution of formaldehyde with the addition of 1.5 grams of sodium carbonate, and condensing the same by heating, adding to the resulting product 100 grams of a condensation product derived from 100 parts by weight of glycerine and 100 parts by weight of phthalic anhydride, boiling for 20 minutes, and allowing the product to set in moulds.

5. In a process of producing condensation products of urea and formaldehyde the steps which consist in mixing 400 grams of trioxymethylene, 400 grams of urea, 100 grams of water and 100 grams of glycerine, with the addition of 10 ccm. 4-n mineral acid, boiling the same, adding thereto 150 grams of the condensation product derived from 220 grams of glycerine and 225 grams of phthalic anhydride, again boiling, and allowing the product to set in moulds.

6. In a process of producing condensation products of urea and formaldehyde the steps which consist in mixing 335 grams of trioxymethylene, 165 grams of 40% formaldehyde solution and 300 grams of urea, with the addition of 20 ccm. 2-n sodium carbonate, boiling the same, adding 450 grams of the condensation product derived from 440 grams of glycol and 180 grams of phthalic anhydride, again boiling for ½ hour, adding 20 ccm. mineral acid, again boiling, and allowing the product to set in moulds.

7. A method of producing a phthalic anhydride polyvalent alcohol modified urea-formaldehyde condensation product, consisting in adding to the condensation product derived from urea and formaldehyde the condensation product obtained from phthalic anhydride and polyvalent alcohols, and then heating the mixture to condense the ingredients.

8. A method of producing a phthalic anhydride-polyvalent alcohol modified urea-formaldehyde condensation product, consisting in adding to the mixture of urea and formaldehyde prior to the condensation the product of condensation derived from phthalic anhydride and polyvalent alcohols, and then heating the mixture to further condense the ingredients.

9. A method of producing a phthalic anhydride-polyvalent alcohol modified urea-formaldehyde condensation product, consisting in adding to the mixture of urea and formaldehyde during the condensation the product of condensation derived from phthalic anhydride and polyvalent alcohols, and then heating the mixture to further condense the ingredients.

10. A method of producing a phthalic anhydride-polyvalent alcohol modified urea-formaldehyde condensation product, consisting in performing condensation of the urea and formaldehyde in a non-neutral solution, and adding the condensation product derived from phthalic anhydride and polyvalent alcohols, and then heating the mixture to further condense the ingredients.

11. The method of producing a phthalic anhydride polyvalent alcohol modified urea-formaldehyde condensation product, consisting in performing condensation of the urea and formaldehyde first in an alkaline and then acid solution, and adding the condensation product derived from phthalic anhydride and polyvalent alcohols, and then heating the mixture to further condense the ingredients.

STEFAN GOLDSCHMIDT.
RUDOLF MAYRHOFER.